United States Patent [19]

Konno et al.

[11] Patent Number: 4,797,695

[45] Date of Patent: Jan. 10, 1989

[54] ELECTROPHOTOGRAPHIC RECORDING SYSTEM

[75] Inventors: Tetsuro Konno; Yutaka Kanai; Tetsuya Fujita, all of Tokyo, Japan

[73] Assignee: Seikosha Co., Ltd., Tokyo, Japan

[21] Appl. No.: 105,503

[22] Filed: Oct. 2, 1987

Related U.S. Application Data

[62] Division of Ser. No. 874,108, Jun. 13, 1986, abandoned.

[30] Foreign Application Priority Data

Jun. 13, 1985 [JP] Japan ............................... 60-128498

[51] Int. Cl.[4] ............................................ G01D 15/00

[52] U.S. Cl. .................................. 346/160; 346/160.1

[58] Field of Search ............. 355/3 DD, 3 R; 430/55, 430/31, 66; 118/648; 346/160, 107 R, 108, 160.1, 158, 159, ; 400/119; 101/DIG. 13; 358/300

[56] References Cited

U.S. PATENT DOCUMENTS

| | | | |
|---|---|---|---|
| 3,730,710 | 5/1983 | Ohta | 430/66 X |
| 4,694,310 | 9/1987 | Saito et al. | 346/160 |
| 4,757,332 | 7/1988 | Yuasa | 346/160 |

*Primary Examiner*—Arthur G. Evans

*Attorney, Agent, or Firm*—Bruce L. Adams; Van C. Wilks

[57] ABSTRACT

The electrophotographic recording apparatus includes a photo-sensitive member comprised of a transparent support plate, a transparent electrode formed on the support, a transparent electrode layer formed on the photoconductive layer, and floating electrodes formed on the photoconductive layer. The floating electrodes are composed of small plural electrode segments independently and electrically insulatively separated from each other. These electrode segments may be separated from each other by insulating partition walls.

The photosensitive member is suitable for use in an electrophotographic recording system of directly transferring charged toner onto a recording paper.

10 Claims, 2 Drawing Sheets

ELECTROPHOTOGRAPHIC RECORDING SYSTEM

This is a divisional of application Ser. No. 874,108, filed June 13, 1986 now abandoned.

FIELD OF THE INVENTION

This invention relates to a photosensitive member for electrophotographic recording, which is used for copying machines, facsimiles, optical printers, etc.

BACKGROUND OF THE INVENTION

As the mainstream of an electrophotographic process, there is a xerographic process, which is fundamentally composed of 6 steps. Namely, the xerographic process is generally comprised of 1st step of electrostatically charging a photosensitive member, 2nd step of light-exposing the photosensitive member to form electrostatic latent images, 3rd step of developing the electrostatic latent images of the photosensitive member by applying thereto a toner, 4th step of transferring the developed toner images onto recording paper by utilizing electric field, a 5th step of fixing the toner images transferred onto the recording paper, and a 6th step of cleaning the photosensitive member for removing remaining toners. In a conventional apparatus, the devices for performing the 1st step to the 4th step and the device for performing the 6th step are separately disposed along a drum-form photosensitive member having a relatively large diameter of a sheet-form photosensitive member and the device for performing the 5th step is disposed in the transporting device for recording papers. (See, R. M. Schaffert, "Electrophotography", published by the Focal Press Limited, London and New York).

On the other hand, in Japanese Patent Publication (Unexamined) No. 77,848/81, there is proposed a photosensitive member having a photoconductive layer formed on a transparent electrode layer and an electrophotographic recording apparatus equipped with a counter electrode disposed facing the photosensitive member, a power source for applying an electric potential between the counter electrode and the above-described transparent electrode layer, and a light exposure means for irradiating the photosensitive member from the transparent electrode layer side according to light images. In the system, a previously electrostatically charged toner ribbon and a recording paper are disposed between the above-described photosensitive member and the counter electrode in a superposed state such that the toner ribbon is in contact with the photoconductive layer and light image exposure is performed by the above-described light exposure device. Then, the toner molten in conformity with the light images by the light exposure is transferred onto the recording paper to perform image formation.

According to a known xerographic process, it is necessary to specifically dispose the devices for performing the steps described above around a photosensitive drum or along a photosensitive sheet, and also both an electrostatically discharging step and a cleaning step are inevitable. Thus, the apparatus for the process is complicated and has a large size, which makes it difficult to reduce the thickness or the size of the apparatus. Furthermore, in the xerographic process, the mechanism of a developing device is complicated and also in the developing step, a toner is brought into contact with the surface of the photosensitive member at a high speed and robs the surface thereof, which gives bad influences to the life of the photosensitive member.

Furthermore, in the prior art disclosed in the above-described Japanese patent publication (unexamined), a toner ribbon is superposed on the whole surface of a recording paper in contact relation and hence there is a problem that when the toner at the portions irradiated by light is molten and transferred onto the recording paper, the toner tends to also attach to the peripheral portion of the transferred image to cause so-called ghost.

On the other hand, for solving the problems, in the above-described prior art, the inventors previously proposed a novel electrophotographic process which can greatly reduce the step numbers as described in Japanese Patent Application No. 99,369/85. The electrophotographic process is comprised of the following 4 steps.

(a) 1st step of uniformly attaching a previously charged toner onto the whole surface of a photoconductive layer of a photosensitive member comprising a transparent support having formed thereon successively a transparent electrode layer and the aforesaid photoconductive layer.

(b) 2nd step of irradiating the photosensitive member with light from the transparent support side to reduce the electric resistance of the photoconductive layer at the light-irradiated portions.

(c) 3rd step of injecting electrostatic charge of the opposite polarity to the toner disposed on the light-irradiated portions through the above-described transparent electrode and the photoconductive layer at the above-described light-irradiated portions having reduced electric resistance by the light irradiation.

(d) 4th step of directly transferring the selected toner into which the charge of the opposite polarity has been injected onto a recording paper which is disposed facing the surface of the photoconductive layer.

In the above-described four steps, the step 2, the step 3 and the step 4 substantially simultaneously proceed at a same position.

SUMMARY OF THE INVENTION

An object of this invention is to provide a photosensitive member suitable for the above-described novel electrophotographic process.

Another object of this invention is to improve the light response, that is the transferring speed of toner onto paper in the above-described novel electrophotographic process.

Still another object of this invention is to improve the quality of the prints obtained by the novel electrophotographic process.

It has now been discovered that the above-described objects of this invention can be attained by the present invention as set forth hereinunder.

Namely, according to this invention, there is provided a photosensitive member for electrophotographic recording comprising a transparent electrode formed on a transparent support, a photoconductive layer formed on the transparent electrode, and plural independent floating electrodes formed on the photoconductive layer. In a specific embodiment of this invention, insulating partition walls are grid-like formed along the boundaries between adjacent floating electrodes.

DETAILED DESCRIPTION OF THE INVENTION

According to the electrophotographic recording photosensitive member of this invention, the toner is in contact with the floating electrodes having good electric conductivity and hence when the photosensitive member is irradiated by light using laser beam, etc., from the transparent support side, the injection of charge of opposite polarity into the toner can be very quickly performed.

Also, in an specific embodiment of this invention, the floating electrodes are each surrounded by insulating partition walls and hence the charge transfer does not occur between adjacent toners separated by the wall, whereby records or images having excellent resolving power can be obtained.

Then, the invention is explained in detail by referring to the accompanying drawings.

Figure 1:
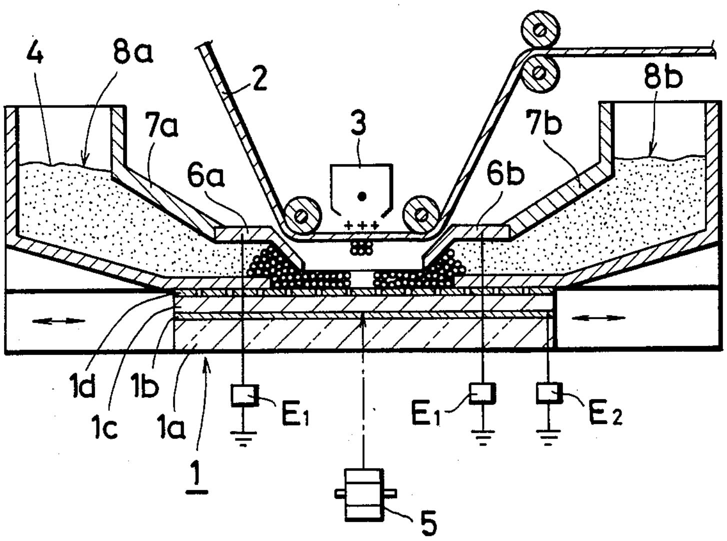
FIG. 1 is a/schematic sectional view showing an embodiment of an electrophotographic recording apparatus employing the photosensitive member of this invention.
Figure 2:
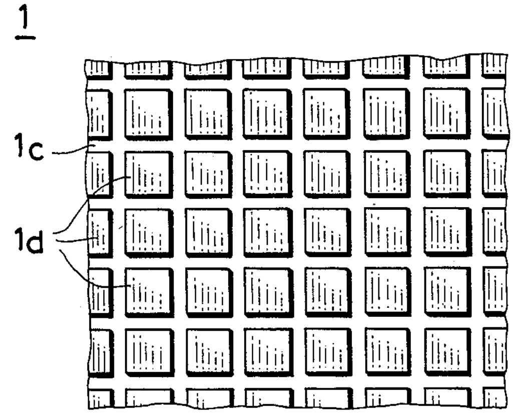
FIG. 2 is an enlarged plane view of a part of the photosensitive member of this invention.

FIG. 1 is a schematic sectional view showing an embodiment of an electrophotographic recording apparatus employing the photosensitive member of this invention.

In FIG. 1, a plate like photosensitive member 1 of this invention is comprised of a transparent support or substrate 1*a*, a transparent electrode layer 1*b* formed on the transparent support 1*a*, a photoconductive layer 1*c* formed on the transparent electrode layer 1*b*, and plural floating electrodes 1*d* formed on the photoconductive layer 1*c*. The floating electrodes 1*d* are composed of independently separated pieces or segments of electrodes which are not electrically connected to outside and the floating electrodes may be transparent or opaque. The size or dimension of each piece of the floating electrodes is at most about a same size as the area determined by the required resolving power of image. Also, the distance between the adjacent floating electrodes 1*d* is less than the diameter of toner particle. The electric conductivity of the floating electrodes 1*d* is higher than the electric conductivity of the photoconductive layer 1*c* under light exposure state.

Above the surface of guiding the photosensitive member 1 are disposed a pair of electrode plates 6*a* and 6*b* (doctor blades) at a definite distance from the surface of the photosensitive member 1 and these electrode plates 6*a* and 6*b* are fixed to a definite position by means of electrode supports 7*a* and 7*b* and connected to power sources $E_1$. Outside the electrode plates 6*a* and 6*b* are formed toner reservoirs 8*a* and 8*b* each of which contains a toner 4. The leading edges of the electrode plates 6*a* and 6*b* are so disposed that a small gap exists between the leading edge and the floating electorodes 1*d*, and the leading edges also have a function of adjusting the thickness of the layer of toner.

A recording paper or medium 2 is disposed facing the photosensitive member 1 and near the back side of the recording paper opposite to the photosensitive member is disposed an electrostatic charging device 3 as an example of toner transferring means. A high electric potential is applied to the electrode plates 6*a* and 6*b* by the power sources $E_1$ for charging the toner and the transparent electrode 1*b* of the photosensitive member 1 is connected to a power source $E_2$ for injecting an electrostatic charge of the opposite polarity to that of the initial charge of the toner into the toner 4 to reverse the electrical polarity of the toner.

The photosensitive member 1 can be reciprocated in right and left directions (in FIG. 1) and the toners contained in the toner reservoirs 8*a* and 8*b* are supplied under the guiding electrode plates 6*a* and 6*b* by the reciprocating movement of the photosensitive member 1. Since in this case a high electric potential is applied to the electrode plate 6*a* and 6*b* by the power sources $E_1$, the toners are charged by the contact with the electrode plates 6*a* and 6*b*. An electrostatic charge of the opposite polarity to that of the toner charge is induced on the surface of the photosensitive member 1 by the charge of the toner and the toners are attracted onto the surface of the photosensitive member 1. Also, the thickness of the toner layer on the surface of the photosensitive member 1 becomes uniform by reciprocating the photosensitive member in right and left directions under the electrode plates 6*a* and 6*b*.

Now, when the photosensitive member 1 is irradiated by a light beam such as laser beam, etc., from the back side thereof using light irradiating means 5 such as Polygon Mirror, etc., under the electrostatic charging device 3 during the movement of the photosensitive member 1 from the left to the right (in FIG. 1), the electric resistance of the photoconductive layer 1*c* is reduced at the light-irradiated portions to establish electric paths through the photoconductive layer. Since the electric conductivity of the photoconductive layer exposed to the light is increased as described above, the injection of the charge of the opposite polarity into the toners at the light-exposed portions is very quickly performed through the paths. Since the photoconductive layer 1*c* and the floating electrodes 1*d* are in face-to-face contact relation, the effective contact area of electrical between the photoconductive layer 1*c* and the toners 4 which are in contact with the surface of the floating electrodes 1*d* becomes apparently large, which results in substantially reducing the contact resistance between the toners 4 and the photoconductive layer 1*c*. As the result thereof, the light response of the toner 4 is greatly improved as compared to the case that the toner is in direct point-contact with a photoconductive layer as in the prior art.

The toners 4 having injected therein the charge of the opposite polarity are directly transferred onto the recording paper 2 by means of the electrostatic charging device 3 as the transferring means. By the transfer of the toners, the toners 4 on the photosensitive member 1 are partially lost but when the photosensitive member 1 moves to the left to the right under the electrode plate 6*b* at the right side (in FIG. 1) and under the toner reservoir 8*b* and then moves from the right to the left, the toner layer becomes uniform again under the electrode plate 6*b* and also, an electrostatic charge is applied thereto at the same time. Furthermore, since the photosensitive member is reciprocated, the position of the photosensitive member 1 to be irradiated by light beam differs each time, whereby the photosensitive member 1 is reluctant to cause light fatigue and the life thereof can be prolonged.

Figure 3:
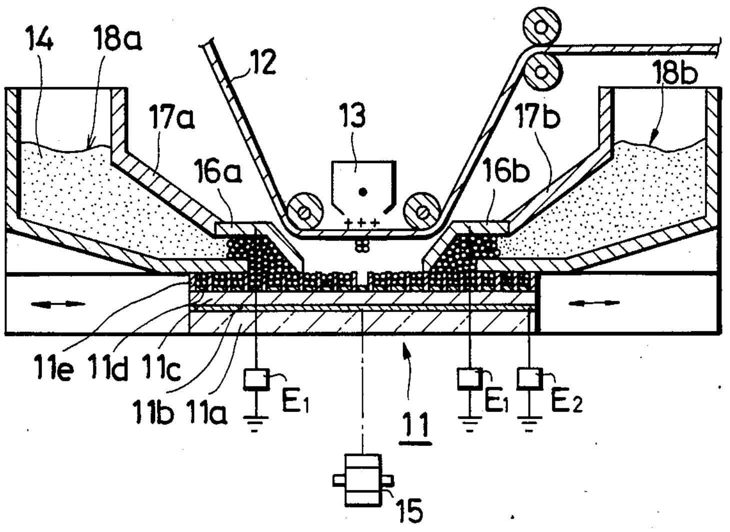
FIG. 3 is a schematic sectional view showing another embodiment of an electrophotographic recording apparatus employing the photosensitive member of this invention.

FIG. 3 is a schematic sectional view showing another example of an electrophtographic recording apparatus employing another embodiment of the photosensitive member of this invention.

Figure 4:
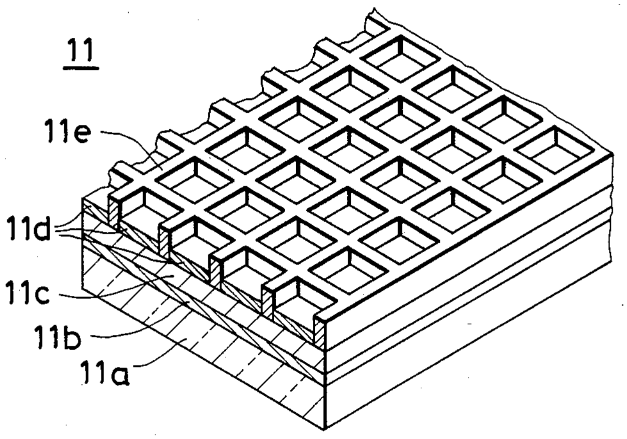
FIG. 4 is an enlarged slant view of a part of the photosensitive member of this invention employed in the apparatus shown in FIG. 3.

In FIG. 3, a photosensitive member 11 of this invention is composed of a transparent support 11*a*, a transparent electrode 11*b* formed on the support 11*a*, a photoconductive layer 11*c*, and floating electrodes 11*d* having the same structure of the photosensitive member 1 shown in FIG. 1, but, in this embodiment, insulating walls (partition walls) 11*e* is provided for partitioning each electrode piece of the floating electrodes 11*d* as shown in FIG. 4. The position of the upper surface of the wall 11*e* is higher than the upper surface of the floating electrodes 11*d* (e.g., about 2 to 3 times the diameter of the toner particle) and a definite amount of toner particles are retained in the space on the surface of each floating electrode 11*d* surrounded by the walls. The walls 11*e* are formed, for example, as follows. Namely, floating electrodes 11*d* of a definite pattern are formed on the surface of the photoconductive layer 11*c*, an insulating layer of a definite thickness is formed thereon by vapor deposition or coating, and then the insulating layer deposited on the upper surfaces of the floating electrodes 11*d* are removed by a photo-etching method. Other construction of the photosensitive member 11 is substantially same as that of the photosensitive member 1 shown in FIG. 1.

Then, the toners electrostatically charged by the same way as in the case of the embodiment shown in FIG. 1 enter the spaces on the floating electrodes 11*d* surrounded by the walls 11*e* by the attraction of the floating electrodes 11*d* and thus when the photosensitive member 11 passes under the electrode plates 16*a* and 16*b*, definite amounts of toner particles only are supplied in the spaces on the floating electrodes 11*d* surrounded by the walls 11*e*. Then, when the photosensitive member 11 is irradiated by light beam under an electrostatic charging device 13 and the electric resistance of the photoconductive layer 11*c* is reduced at the light-exposed portions, the polarity of the toners at the portions become opposite to the initial one and the toners having the opposite polarity are directly transferred onto a recording paper 12 by the action of the charging device 13.

Now, the case that the walls 11*e* are not formed and the thickness of the toner layer is thick (e.g., about 10 times the diameter of toner particle) is considered. In this case, when and electrostatic charge of opposite polarity is injected into toners, the toners in the upper layer portion has the opposite polarity and after the polarity of the toners disposed under the aforesaid upper layer becomes opposite to the initial polarity, the electrostatic charge transfers among toners, which results in long time required for reversing the polarity of toners. Also, if the thickness of the toner layer is thick, the transfer of electrostatic charges to the traverse direction is increased in proportion thereto and thus even the toners at the portions which were not irradiated by light are also charged to the opposite polarity, which results in greatly reducing the resolving power. If the electric conductivity of toner is increased, the time for the charge transfer can be shortened but in such a case, the reduction of the resolving power is unavoidable. However, according to the specific embodiment of this invention, the thickness of the toner layer can be easily adjusted to about 2 to 3 times the diameter of the toner particle by the arrangement of the partition walls 11*e* and also the toners are supplied to the spaces on the floating electrodes surrounded by the insulating walls 11*e*. Accordingly, the electrostatic charge on the toners in the space surrounded by the walls 11*e* cannot trasfer to the outside of the space in the transverse direction, whereby the reduction in resolving power does not occur even when the electric conductivity of toner is increased and the time for the charge transfer is shortened.

As described above, according to the photosensitive member of this invention, in the case of employing the above-described novel electrophotographic process of directly transferring toner onto a recording medium, the transfer of the charge of toner is quickly performed by the existence of the floating electrodes and the transfer speed of the toner onto a recording paper, that is, the light response is improved. Also, by the existence of the insulating partition walls, the electric conductivity of toner can be increased without casing the reduction of resolving power and hence the quality of prints can be increased.

What is claimed is:

1. An electrophotographic recording apparatus comprising: a transparent substrate having front and rear surfaces; a transparent electrode layer disposed on the front surface of the substrate; a photoconductive layer disposed on the electrode layer; a plurality of floating electrode segments disposed separate from but close to one another on the photoconductive layer; feeding means for feeding electrically charged toner onto the floating electrode segments such that the charged toner is electrostatically attracted onto the floating electrode segments; irradiating means for selectively irradiating an optical beam onto the photoconductive layer from the rear surface of the substrate to establish electrical paths extending through the photoconductive layer at the selectively irradiated portions thereof to thereby selectively electrically connect the floating electrode segments to the electrode layer; supplying means electrically connected to the electrode layer for supplying electric charge having opposite polarity relative to the polarity of the charged toner to the selected floating electrode segments through the electrical paths to inject the electrical charge into the toner attracted to the selected floating electrode segments through the surface thereof to thereby reverse the polarity of the toner; and transferring means for directly transferring the polarity-reversed toner to a printing medium to thereby produce a visible image on the printing medium.

2. An electrophotographic recording apparatus according to claim 1; wherein the floating electrode segments have a dimension determined according to a certain resolving power of the image.

3. An electrophotographic recording apparatus according to claim 1; wherein the floating electrode segments are spaced from one another a distance smaller than a particle diameter of the toner.

4. An electrophotographic recording apparatus according to claim 1; wherein each of the floating electrode segments has a rectangular shape, and the floating electrode segments are arranged in column-row matrix.

5. An electrophotographic recording apparatus according to claim 1; wherein the floating electrode segments have an electrical conductivity greater than that of the electrical paths.

6. An electrophotographic recording apparatus according to claim 4; including insulating partition walls disposed along the boundary of the floating electrode segments for electrically insulating adjacent electrode segments from one another.

7. An electrophotographic recording apparatus according to claim 1; including insulating partition walls disposed along the boundary of the floating electrode segments for electrically insulating adjacent segments from one another.

8. An electrophotographic recording apparatus according to claim 7; wherein the insulating partition walls have a height as measured from the surface level of the floating electrode segments effective to determine the thickness of the toner to be attracted to the floating electrode segments.

9. An electrophotographic recording apparatus according to claim 1; wherein the feeding means comprises a reservoir for storing therein the toner, and a guiding electrode plate disposed at an outlet of the reservoir for guiding the toner to the floating electrode segments and for charging the toner during the guiding thereof.

10. An electrophotographic recording apparatus according to claim 1; wherein the transferring means comprises positioning means for positioning a printing medium on the floating electrode segments, and means opposed to the floating electrode segments relative to the printing medium for applying an electric field to the polarity-reversed toner to transfer the same to the printing medium.

* * * * *